J. F. KNORR.
Improvement in Harness-Pads.
No. 132,472. Patented Oct. 22, 1872.
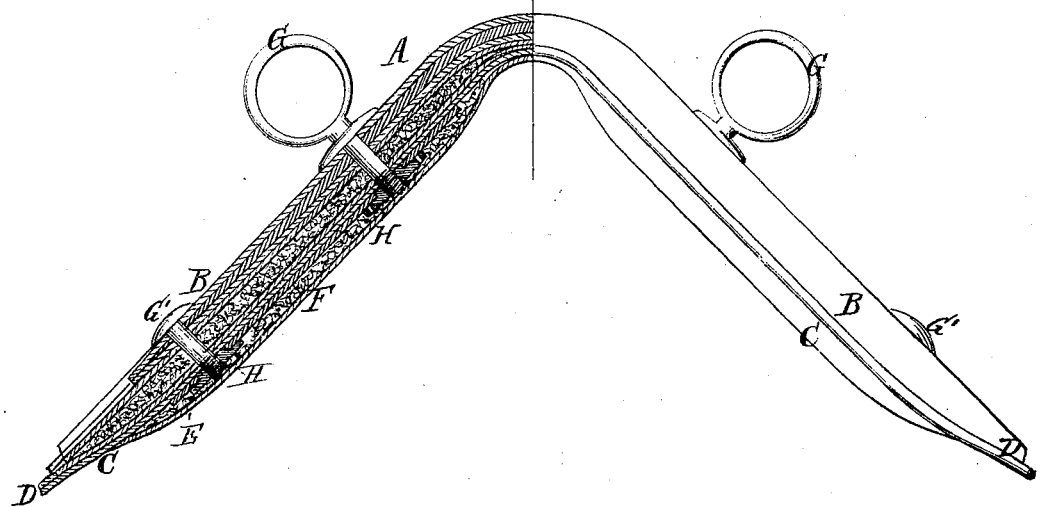
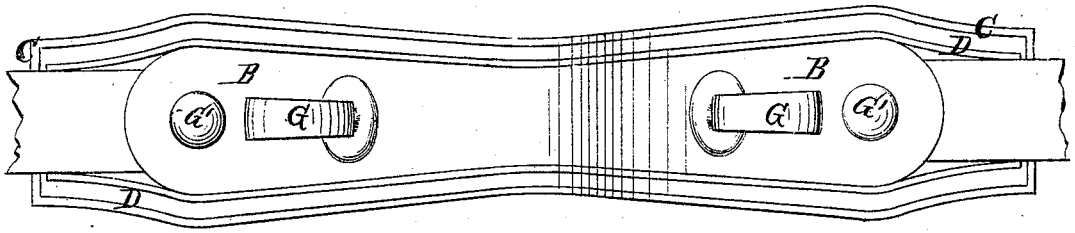
Witnesses.
Ernst Bilhuber.
C. Wahlers.
Inventor.
Jacob F. Knorr
pr
Van Santvoord & Hauff
atty

UNITED STATES PATENT OFFICE.

JACOB F. KNORR, OF NEW YORK, N. Y.

IMPROVEMENT IN HARNESS-PADS.

Specification forming part of Letters Patent No. 132,472, dated October 22, 1872.

*To all whom it may concern:*

Be it known that I, JACOB F. KNORR, of the city, county, and State of New York, have invented a new and useful Improvement in Harness-Pads; and I do hereby declare the following to be a full, clear, and exact description thereof, which will enable those skilled in the art to make and use the same, reference being had to the accompanying drawing forming part of this specification, in which drawing—

Figure 1 is an end view of my improvement, one side being shown in vertical section; and Fig. 2 is a top view.

Similar letters indicate corresponding parts.

This invention relates to harness-pads; and consists in a novel construction, whereby a better "bearing," as it is technically called, is obtained on the body of the horse or other animal without an appearance of increased size or weight, and the pad retains its position when girthed upon the horse, and is held substantially and with less liability to shift, and the horse consequently is less liable to injury from chafing or change of position of the pad or its housing. The additional or increased "bearing" is obtained by my invention by means of a stiff or rigid housing, which may be of ordinary shape and dimensions. The housing is stiffened by means of a layer of rigid material—such, for instance, as wood, iron, steel, or other proper material—and the same can be conveniently arranged in the ornamental housing beneath its outer exposed surface, so as to be concealed from view. The stiffening is made a little narrower than the housing, so that it can be contained therein, and the housing and the harness-pad are firmly connected to each other by means of the terrets and pad-screws, whose screw ends pass through the pad and into the housing, where they are screwed into nuts placed in the stiffening to receive them.

The letter A designates a harness-pad complete, B being the overlying portion and C the part called the housing, on which the pad rests. The outer or upper surface D of the housing is ornamented in any suitable manner, and beneath that surface I confine a stiffening-plate, E, which extends in all directions under the upper layer of the housing, nearly to its edge, so as to form an extended and substantial "bearing" to support the housing on the body and sides of the animal, and to keep the housing in shape and prevent it from curling or turning up along its edges. The stiffening-plate, whether made of iron, wood, or other rigid material, is underlaid by a padding of felt or other soft material, F, which is graduated and shaped on the under side of the stiffening to fit the back of a horse and prevent injury to the animal by reason of the stiffening. The housing thus constructed is connected to the "pad" by means of the terrets G and the pad-screws G', whose screw-shanks are screwed down through the pad into the housing, which is provided at suitable places with burrs or nuts H H, in which the screws enter to hold the housing and pad to each other. The burrs or nuts are secured to the stiffening in any convenient manner. A housing made according to my invention, as above described, will remain straight and in proper position, and retain its form in use, and will possess a better and increased "bearing" on the animal, and thereby conduce to his comfort, and be less liable than housings, as now made, to injure the animal.

By my invention the part of the pad designated in the drawing by the letter B, and which heretofore has been disconnected from the housing, only resting thereon, and held down by transverse loops or bands on the housing, is firmly connected to the housing by the terrets and pad-screws G G', thereby gaining greater compactness and a better appearance. The pad will rest more firmly on the horse, and will remain more erect or straight than those made in the style heretofore known.

What I claim as new, and desire to secure by Letters Patent, is—

A pad for harness-saddles provided with a stiffening-plate, E, to be attached to the housing and secured to the saddle, substantially as described, and for the purpose set forth.

JACOB F. KNORR.

Witnesses:
W. HAUFF,
E. F. KASTENHUBER.